United States Patent
Hwang et al.

(10) Patent No.: US 9,451,205 B2
(45) Date of Patent: Sep. 20, 2016

(54) SIGNAL TRANSCEIVING APPARATUS AND SIGNAL TRANSCEIVING METHOD

(71) Applicant: LG ELECTRONICS INC., Seoul (KR)

(72) Inventors: Soojin Hwang, Seoul (KR); Jongyeul Suh, Seoul (KR); Jinpil Kim, Seoul (KR); Hotaek Hong, Seoul (KR); Jeehyun Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/415,516

(22) PCT Filed: Aug. 8, 2013

(86) PCT No.: PCT/KR2013/007154
§ 371 (c)(1),
(2) Date: Jan. 16, 2015

(87) PCT Pub. No.: WO2014/025213
PCT Pub. Date: Feb. 13, 2014

(65) Prior Publication Data
US 2015/0229878 A1    Aug. 13, 2015

Related U.S. Application Data

(60) Provisional application No. 61/681,642, filed on Aug. 10, 2012.

(51) Int. Cl.
*H04N 5/38* (2006.01)
*H04N 7/01* (2006.01)
(Continued)

(52) U.S. Cl.
CPC .......... *H04N 7/0127* (2013.01); *H04N 7/0125* (2013.01); *H04N 21/2362* (2013.01);
(Continued)

(58) Field of Classification Search
CPC .. H04N 13/004; H04N 13/0066; H04N 5/00; H04N 19/105; H04N 19/00769; H04N 19/56; H04N 21/2362; H04N 21/816; H04N 21/2365; H04N 21/4345; H04N 21/8451
USPC .................................. 348/43, 723, 725, 500
See application file for complete search history.

(56) References Cited

U.S. PATENT DOCUMENTS

| | | | |
|---|---|---|---|
| 8,780,991 B2* | 7/2014 | Kwon ............... | H04N 19/56 375/240.16 |
| 8,982,186 B2* | 3/2015 | Choi ............... | H04N 13/004 348/43 |

(Continued)

FOREIGN PATENT DOCUMENTS

| | | |
|---|---|---|
| CN | 102356642 A | 2/2012 |
| JP | 2002-10251 A | 1/2002 |

(Continued)

OTHER PUBLICATIONS

Kumai et al, "Sharp's proposals for HEVC scalability Extension," ISO/IEC JTC1/SC29/WG11MPEG2011/m23618, San José, USA, Feb. 6, 2012, XP030052143, 5 pages.

*Primary Examiner* — Trang U Tran
(74) *Attorney, Agent, or Firm* — Birch, Stewart, Kolasch & Birch, LLP

(57) ABSTRACT

The present invention relates to a signal transceiving apparatus and a signal transceiving method. One embodiment of the present invention provides a signal transceiving method comprising: a step of generating HD video from UHD video and obtaining residual data of the UHD video, remaining after converting the HD video from the UHD video; and a step of transmitting the converted HD video to a base layer stream and the residual data to an enhancement layer stream.

6 Claims, 14 Drawing Sheets

(51) Int. Cl.
  *H04N 21/2343* (2011.01)
  *H04N 21/434* (2011.01)
  *H04N 21/4402* (2011.01)
  *H04N 21/236* (2011.01)
  *H04N 21/2362* (2011.01)

(52) U.S. Cl.
  CPC .......... *H04N21/23614* (2013.01); *H04N 21/234327* (2013.01); *H04N 21/234363* (2013.01); *H04N 21/234381* (2013.01); *H04N 21/4345* (2013.01); *H04N 21/4348* (2013.01); *H04N 21/440227* (2013.01)

(56) References Cited

U.S. PATENT DOCUMENTS

| | | | |
|---|---|---|---|
| 2002/0051581 A1 | 5/2002 | Takeuchi et al. | |
| 2008/0043832 A1 | 2/2008 | Barkley et al. | |
| 2008/0225952 A1* | 9/2008 | Wang | H04N 19/105 375/240.16 |
| 2010/0325676 A1* | 12/2010 | Kim | H04H 20/40 725/105 |
| 2011/0032422 A1* | 2/2011 | Yamamoto | G06T 3/4053 348/500 |
| 2012/0033041 A1 | 2/2012 | Nagaraj et al. | |
| 2012/0042333 A1 | 2/2012 | Lee et al. | |
| 2012/0200666 A1 | 8/2012 | Suh et al. | |
| 2013/0242050 A1 | 9/2013 | Choi et al. | |

FOREIGN PATENT DOCUMENTS

| | | |
|---|---|---|
| JP | 2009-212881 A | 9/2009 |
| JP | 2010-11154 A | 1/2010 |
| JP | 2010-501141 A | 1/2010 |
| JP | 2011-232225 A | 11/2011 |
| JP | 2013-90296 A | 5/2013 |
| KR | 10-2004-0080164 A | 9/2004 |
| KR | 10-2010-0104077 A | 9/2010 |
| KR | 10-2011-0055011 A | 5/2011 |
| KR | 10-2012-0019754 A | 3/2012 |
| KR | 10-2012-0058700 A | 6/2012 |
| WO | WO 2010/107220 A2 | 9/2010 |
| WO | WO 2013/068314 A1 | 4/2013 |

* cited by examiner

FIG. 12

| stream_type | Description |
|---|---|
| 0x30 | AVC/SVC stream |
| 0x31 | HEVC scalable extension stream |
| 0x32 | Stream acquired by coding hybrid delta stream by ABC |
| 0x33 | Stream acquired by coding hybrid delta stream by HEVC |

FIG. 13

| Syntax | No. of bits | Format |
|---|---|---|
| UHD_program_descriptor ( ) { | | |
| descriptor_tag | 8 | uimsbf |
| descriptor_length | 8 | uimsbf |
| UHD_video_type | 3 | uimsbf |
| UHD_sub_service_type | 5 | uimsbf |
| } | | |

FIG. 14

| UHD_video_type | Description |
|---|---|
| 000 | reserved |
| 001 | 3840 x 2160 @ 60p |
| 010 | 3840 x 2160 @ 120p |
| 011 | 4096 x 2160 @ 60p |
| 100 | 7680 x 4320 @ 60p |
| 101 | 7680 x 4320 @ 120p |
| 110 ~ 111 | reserved |

FIG. 15

| UHD_sub_service_type | Description |
|---|---|
| 0x00 | reserved |
| 0x01 | UHD service, Non-HD-compatible |
| 0x02 | UHD service, HD-compatible |
| 0x03 | UHD service, HD-compatible, hybrid delivery |
| 0x04 ~ 0x1F | reserved |

FIG. 16

| Syntax | No. of bits | Format |
|---|---|---|
| UHD_enhancement_descriptor ( ) { | | |
|     descriptor_tag | 8 | uimsbf |
|     descriptor_length | 8 | uimsbf |
|     UHD_video_type | 3 | uimsbf |
|     upscale_parameter_included | 1 | bslbf |
|     reserved | 4 | uimsbf |
| } | | |

FIG. 17

| Syntax | No. of bits | Format |
|---|---|---|
| terrestrial_virtual_channel_table_section ( ) { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channel_in_section | 8 | uimsbf |
|     for (i=0; i< num_channel_in_section; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hid_guide | 1 | bslbf |
|         reserved | 3 | '11' |
|         service_type | 6 | uimsbf |
|         source_id | 16 | uimsbf |
|         reserved | 6 | '111111' |
|         descriptors_length | 10 | uimsbf |
|         for (i=0; i< N; i++) { | | |
|             descriptor( ) | | |
|         } | | |
|     } | | |
| } | | | service_type → Which can be designated to parameterized service (0x07), extended parameterized service(0x09) or new DTV service – UHDTV (0x10)

descriptor( ) → UHD_program_descriptor() + UHD_component_descriptor

FIG. 18

| Syntax | No. of bits | Format |
|---|---|---|
| UHD_component_descriptor ( ) { | | |
|     descriptor_tag | 8 | uimsbf |
|     descriptor_length | 8 | uimsbf |
|     num_of_components | 8 | uimsbf |
|     for (i=0; i<num_of_components; i++) { | | |
|         UHD_video_codec_type | 8 | uimsbf |
|         UHD_video_profile | 8 | uimsbf |
|         UHD_video_level | 8 | uimsbf |
|         UHD_video_resolution | 3 | uimsbf |
|         UHD_video_frame_rate | 3 | uimsbf |
|         UHD_component_type | 2 | uimsbf |
|     } | | |
| } | | |

FIG. 19

| Syntax | No. of bits | Mnemonic |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j=0; j<N; j++) { | | |
|             descriptor() | | |
|         } | | |
|     } | | |
|     CRC_32 | 32 | rpchof |
| } | | | descriptor() → UHD_program_descriptor() + UHD_component_descriptor

FIG. 20

| Syntax | No. of bits | Mnemonic |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i< N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i=0; i< N; i++) { | | |
|             descriptor( ) | | |
|         } | | |
|     } | | |
|     CRC_32 | 32 | rpchof |
| } | | | descriptor( ) → UHD_program_descriptor() + UHD_component_descriptor

SIGNAL TRANSCEIVING APPARATUS AND SIGNAL TRANSCEIVING METHOD

CROSS REFERENCE TO RELATED APPLICATIONS

This application is the National Phase of PCT/KR2013/007154 filed on Aug. 8, 2013, which claims priority under 35 U.S.C. 119(e) to U.S. Provisional Application No. 61/681,642 filed on Aug. 10, 2012, all of which are hereby expressly incorporated by reference into the present application.

TECHNICAL FIELD

The present invention relates to apparatuses for transmitting/receiving signals and methods for transmitting/receiving signals.

BACKGROUND ART

As a video signal processing speed increases, methods for encoding/decoding ultra high definition (UHD) video signals are studied. UHD video is defined as a high definition (HD) video image having a resolution corresponding to quadruple or 16 times the resolution of HD video. High efficiency codec technology for transmitting UHD video television signals using a single codec is developed by some standardization organizations. However, current broadcast systems cannot transmit/receive UHD video even if a method for encoding/decoding the UHD video is provided since a method for transmitting the UHD video is not defined in the current broadcast systems. Further, even when a system for transmitting/receiving the UHD video is provided, the system is less likely to be utilized unless the system is compatible with conventional video transmitting/receiving systems. Accordingly, compatibility with conventional broadcast or video transmitting/receiving systems becomes an issue.

For example, when a conventional HDTV receiver receives UHD video, there is no method for receiving or displaying HD video without any problems. Particularly, both UHDTV and HDTV need to receive or output video signals without any problems using one UHD video in a process of transmitting UHD signals. However, a method for receiving or outputting video signals using one UHD has not been provided. Especially, a method for extracting 60 interlaced video frames from 60 progressive video frames has not been proposed.

That is, there is no method for viewing HD compatible images without any problems when an HDTV receiver having a different scan mode and a different frame rate receives UHDTV streams.

DISCLOSURE

Technical Problem

An object of the present invention is to provide methods for transmitting/receiving signals and apparatuses for transmitting/receiving signals, which are compatible with conventional broadcast or video transmitting/receiving systems when UHD video is transmitted and received.

Another object of the present invention is to provide methods for transmitting/receiving signals and apparatuses for transmitting/receiving signals to enable a conventional HDTV receiver to receive or display HD video without any problems when receiving UHD video, in transmission and reception of the UHD video.

Technical Solution

To accomplish the object of the present invention, there is provided a method for transmitting a signal, including: generating an HD video from a UHD video and acquiring residual data of the UHD video, remaining after converting the HD video from the UHD video; and transmitting the converted HD video as a base layer stream and transmitting the residual data as an enhancement layer stream.

To accomplish the other object of the present invention, there is provided an apparatus for receiving a signal, including: a receiver for receiving an HD video and residual data for restoring a UHD video along with the HD video; and an output unit for decoding the HD video and outputting the decoded HD video or restoring the UHD video using the HD video and the residual data and outputting the UHD video.

Advantageous Effects

According to embodiments of the present invention, it is possible to provide a UHD video transmitting/receiving method compatible with conventional broadcast or video transmitting/receiving systems.

According to embodiments of the present invention, a conventional HDTV receiver can receive or display HD video when receiving UHD video, in transmission and reception of UHD video.

DESCRIPTION OF DRAWINGS

FIG. 12 illustrates stream type values of streams according to an embodiment of the present invention.

FIG. 13 illustrates a UI-ID program descriptor according to an embodiment of the present invention.

FIG. 14 illustrates UHD_video_type field values and description thereof.

FIG. 15 illustrates UHD_sub_service_type field values and description thereof.

FIG. 16 illustrates an example of UHD_enhancement_descriptor.

FIG. 17 illustrates a VCT as signaling information according to an embodiment of the present invention.

FIG. 18 illustrates a descriptor that can be included in the VCT according to an embodiment of the present invention.

FIG. 19 illustrates an SDT as signaling information.

FIG. 20 illustrates an EIT as signaling information.

BEST MODE

Reference will now be made in detail to the preferred embodiments of the present invention, examples of which are illustrated in the accompanying drawings.

Figure 1:
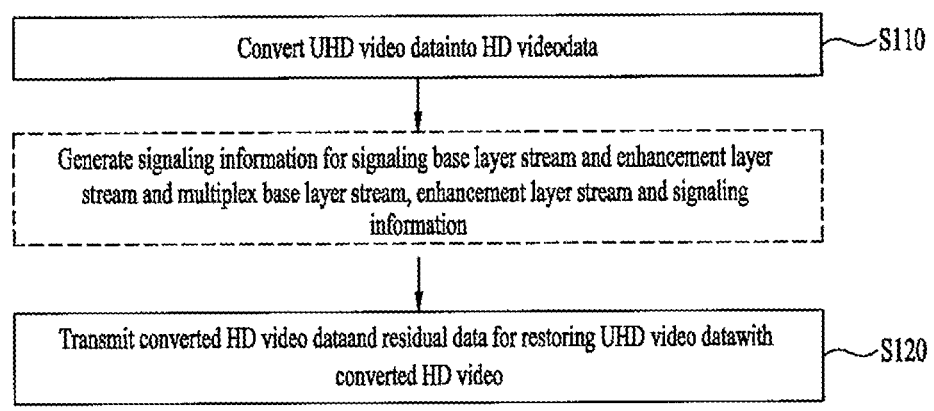
FIG. 1 illustrates a method for transmitting a signal according to an embodiment of the present invention.

FIG. 1 illustrates a method for transmitting a signal according to an embodiment of the present invention. The method for transmitting a signal according to an embodiment of the present invention will now be described with reference to FIG. 1.

UHD video data is converted to HD video data (S110).

For example, when UHD video data is converted into HD video data, UHD video data of a first frame rate can be converted into progressive HD video data of the first frame rate, and the converted progressive HD video data of the first frame rate can be converted into progressive HD video data of a second frame rate corresponding to half the first frame rate or into interlaced HD video data of the first frame rate.

Alternatively, in conversion of UHD video data into HD video data, a UHD video data of the first frame rate can be converted into progressive HD video data of the second frame rate corresponding to half the first frame rate or into interlaced HD video data of the first frame rate.

Figure 3:
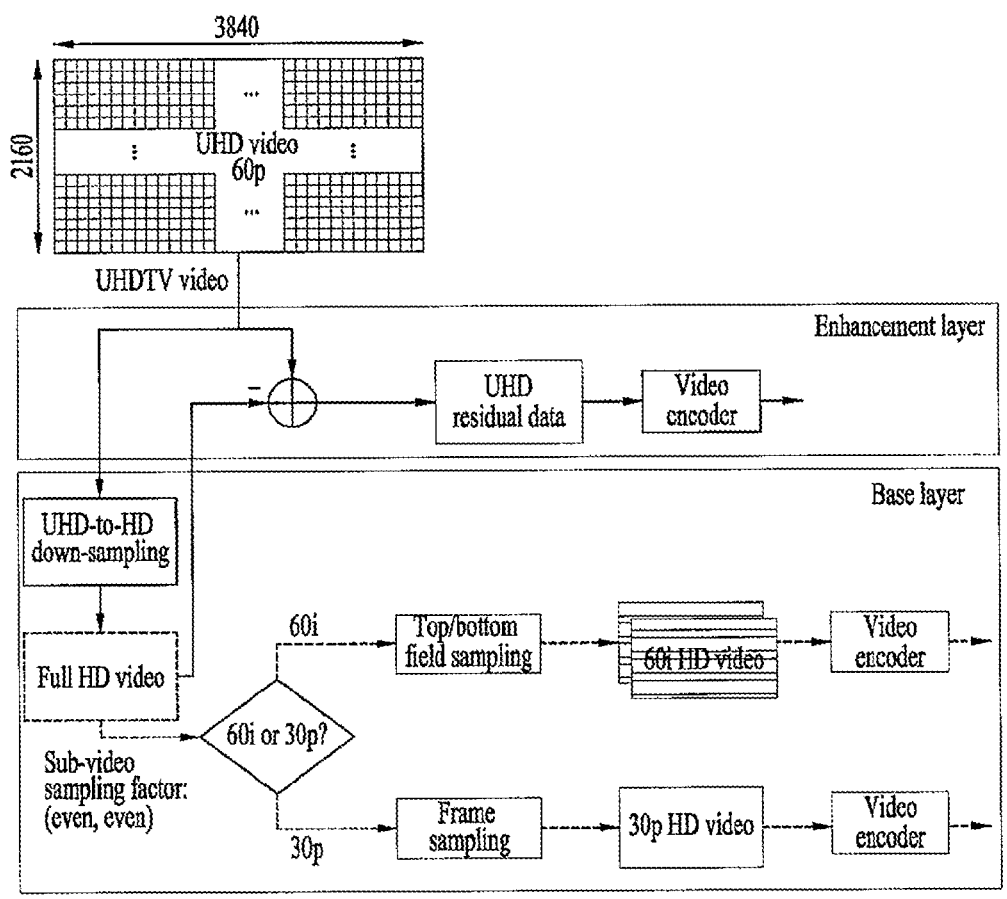
FIG. 3 illustrates the method shown in FIG. 2 in detail.

An embodiment of converting UHD video data into HD video data is illustrated in FIG. 3. The embodiment shown in FIG. 3 is illustrated in detail in FIGS. 4 to 8.

The converted HD video data and residual data, which can be used to decode the UHD video data along with the HD video data, are transmitted (S120).

For example, signaling information for signaling a base layer stream and an enhancement layer stream can be generated and the base layer stream, the enhancement layer stream and the signaling information can be multiplexed. This will be described below with reference to FIG. 8.

According to an embodiment of the present invention, an additionally transmitted HD video and signaling information used to decode a UHD video using the HD video may be simultaneously transmitted. The signaling information will be described below in detail with reference to FIGS. 10 to 20.

Figure 2:
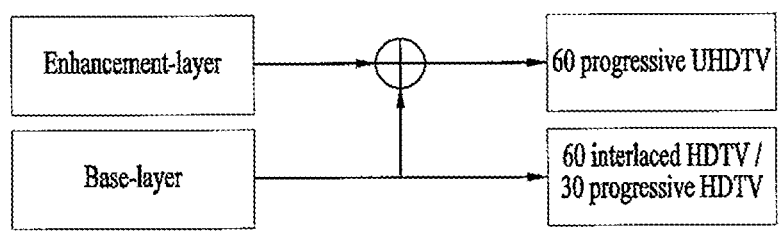
FIG. 2 illustrates a method for generating a UHD video signal according to an embodiment of the present invention.

FIG. 2 illustrates a method for composing a UHD video signal according to an embodiment of the present invention.

The source of a UHD video may be encoded into a base layer and an enhancement layer using SVC. HD video signals may be extracted from the source of the UHD video and encoded into a base layer, and a residual video signal necessary to upscale the HD video signals into UHD video signals may be encoded into the enhancement layer.

In the present embodiment, the source of the UHD video is encoded into a base layer of 60 interleaved HD video data or 30 progressive HD video data. In addition, upscaling may be performed (the 30 progressive HD video data are upscaled into 30 progressive UHD video data and the 60 interlaced HD video data are upscaled into 60 interlaced UHD video data) and the residual video signal may be encoded into the enhancement layer.

FIG. 3 illustrates an example of the embodiment shown in FIG. 2 in detail. A description will be given of two examples of separating an HD video from a UHD video.

The first example includes a first step of converting 60 progressive UHD video data (3840×2160@60p) into 60 progressive HD video data (1920×1080@60p) and a second step of converting the extracted 60 progressive HD video frames into HD videos corresponding to 60 interlaced HD video data (1920×1080@60i) or 30 progressive HD video data (1920×1080@30p) in the case of 4K UHD video.

In this figure, the 60 progressive UHD video data are down-sampled into 60 progressive HD video data using scaling, decimation or the like so as to extract the 60 progressive HD video data (UHD-to-HD down-sampling). In the present embodiment, the 60 progressive HD video data can be encoded into 60i HD video data using top/down field sampling or encoded into 30p HD video data through frame sampling on an even or odd frame basis. The encoded 60i HD video data or 30p HD video data are encoded into a base layer and transmitted.

In the second example, 60 progressive UHD video data (3840×2160@60p) can be directly converted into HD videos corresponding to 60 interlaced HD video data (1920×1080@60i) or 30 progressive HD video data (1920×1080@30p) without the first step.

In the UHD videos, the HD video signals 1920×1080@60i can be extracted through down-sampling (scaling or decimation) and the HD video signals 1920×1080@30p can be extracted through a method using frame skipping and down-sampling.

In the two examples, UHD residual data corresponding to the difference between the UHD videos and the HD videos is encoded into an enhancement layer and transmitted.

Figure 4:
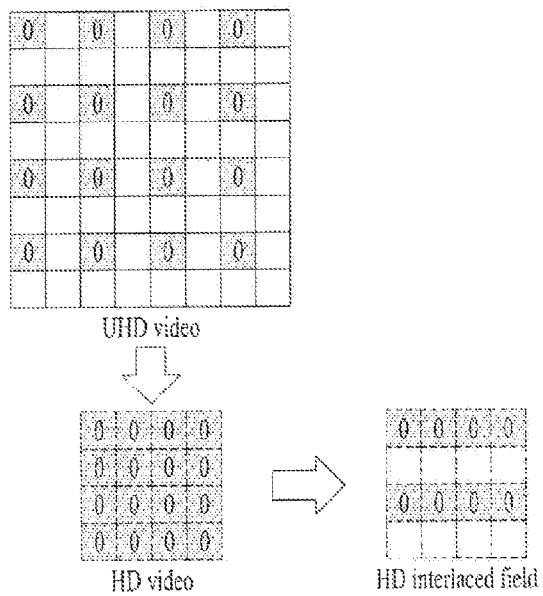
FIG. 4 illustrates another example of converting a UHD video signal into an HD video signal.

FIG. 4 illustrates the above-described example of converting UHD video into HD video in detail. In the figure, a UHD video of 3840×2160@60p can be converted into an HD video of 1920×1080@60p or 1920×1080@60i through pixel sampling.

One of sampling methods for converting UHD video to HD video is decimation that selects and converts only pixels of specific positions through sampling. Four cases are possible according to sampling position. That is, in four pixel regions, it is possible to use (1) sampling of combinations of even positions on the abscissa and even positions on the ordinate, (2) sampling of combinations of even positions on the abscissa and odd positions on the ordinate, (3) sampling of combinations of odd positions on the abscissa and even positions on the ordinate and (4) sampling of combinations of odd positions on the abscissa and odd positions on the ordinate. The figure illustrates decimation that converts UHD video into HD video through simple sampling of (even, even) combination in the UI-ID video. 1920×1080@60i HD video can be obtained by extracting HD interlaced video from the 1920×1080@60p HD video acquired as described above. While four 2×2 pixel regions are selected in the case of 4K UHD video, 16 4×4 pixel regions may be used in the case of 8K UHD video.

Figure 5:
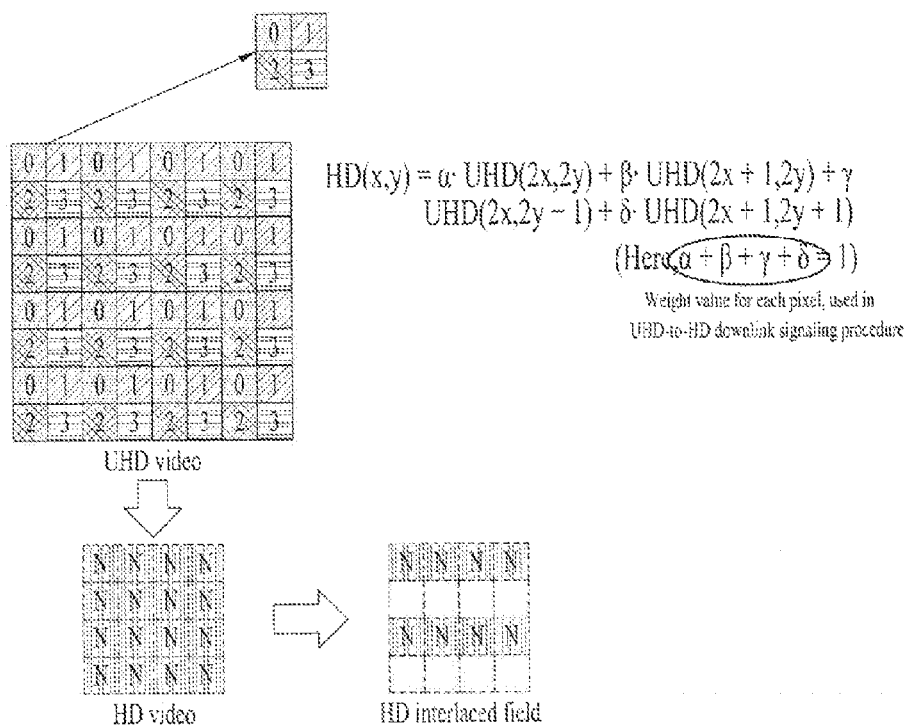
FIG. 5 illustrates another example of converting a UHD video signal into an HD video signal.

FIG. 5 illustrates another example of converting UHD video into HD video in detail. In the case of 4K UHD video, four samples in a 2×2 pixel region of a video signal can be weighted and sampled, and an interlaced field can be extracted from the sampled HD video. Here, a mathematical expression applied to each pixel is as illustrated in the figure and the sum of coefficients of respective pixels can be 1. That is, the 4K UHD video can be down-sampled such that a new HD pixel is formed for every four pixels. In another method for generating an HD video from a UHD video, the number of input pixels used in spatial down-sampling is not limited to 2×2 in the above embodiment and N×N neighboring pixels can be used.

Figure 6:
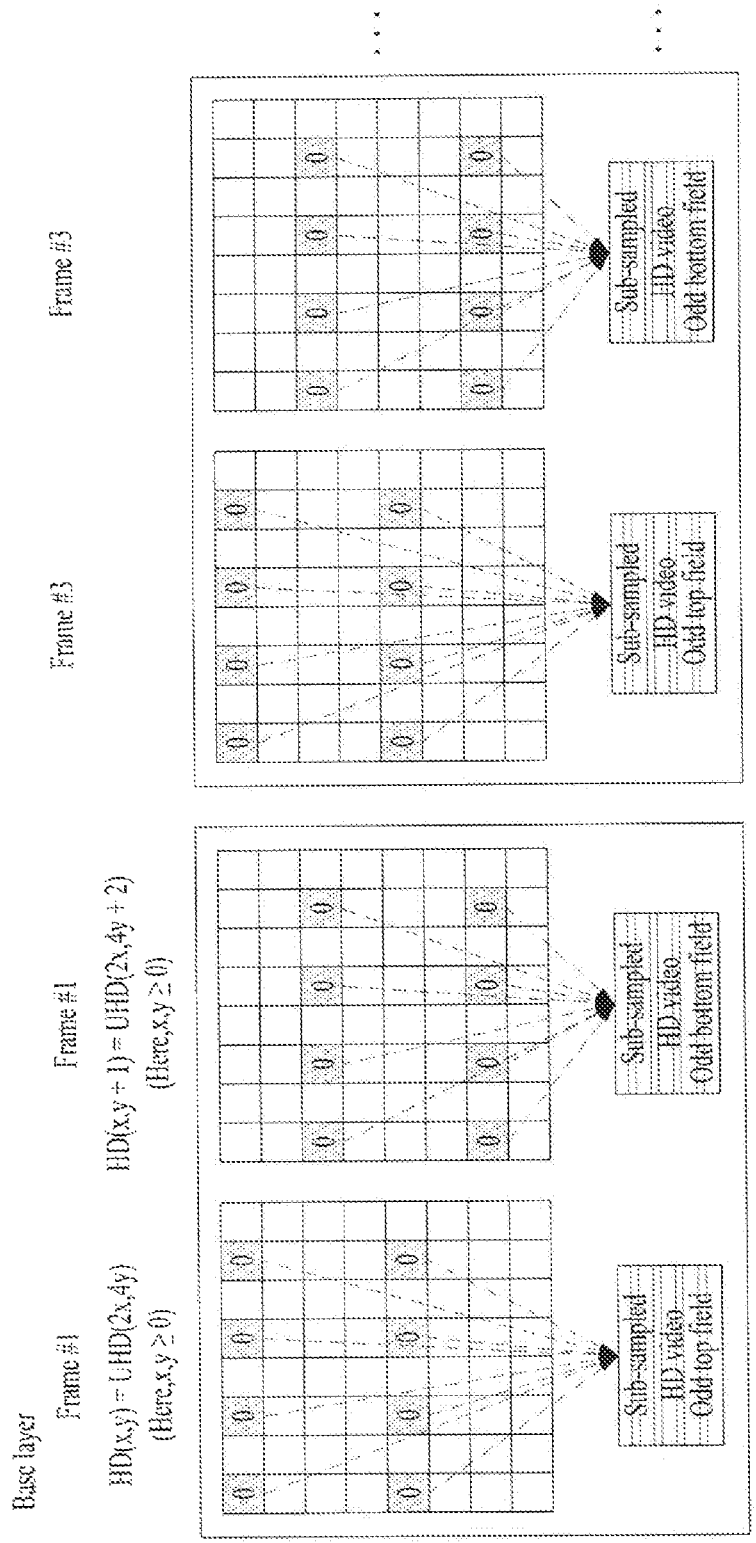
FIG. 6 illustrates another example of converting a UHD video signal into a HD video signal in detail.

FIG. 6 illustrates another example of converting UHD video into HD video. This figure shows an example of directly converting UHD video data (3840×2160@60p) into HD video data (1920×1080@60i).

For example, when the UHD video data (3840×2160@60p) are down-sampled into the HD video data (1920×1080@60i), only odd frames or even frames are selected. In this example, odd frames (frame #1 and frame #3) are selected. When sub-sampling is performed, a pixel HD (x, y) of the odd top field of an HD video frame can be determined using a pixel UHD (2x, 2y) in the UHD video odd frame (frame #1), and a pixel UHD (2x, 4y+2) in the same UHD video odd frame (frame #1) can be determined as a pixel HD (x, y+1) of the odd bottom field of the HD video frame. Since the same frame (frame #1) is used, a UHD video frame can be converted into an HD video interlaced frame without having a time difference.

In the same manner, a pixel HD (x, y) of the odd top field of an HD video frame can be determined using a pixel UHD (2x, 2y) in the UHD video odd frame (frame #3), and a pixel UHD (2x, 4y+2) in the same UHD video odd frame (frame #3) can be determined as the pixel HD (x, y+1) of the odd bottom field of the HD video frame.

To generate 60 interlaced fields from 60 UHD source video data, a top field and a bottom field are used in every odd (or even) frame. That is, the top field and the bottom field use the same frame, and a method of generating 1 pixel, having a weight of 4 pixels, in a UHD video frame is applied and sampling is performed while skipping 2 pixels each in the vertical direction.

In this manner, the UHD video data (3840×2160@60p) can be converted into the HD video data (1920×1080@60i) and the converted frames can be encoded into a base layer and transmitted.

Figure 7:
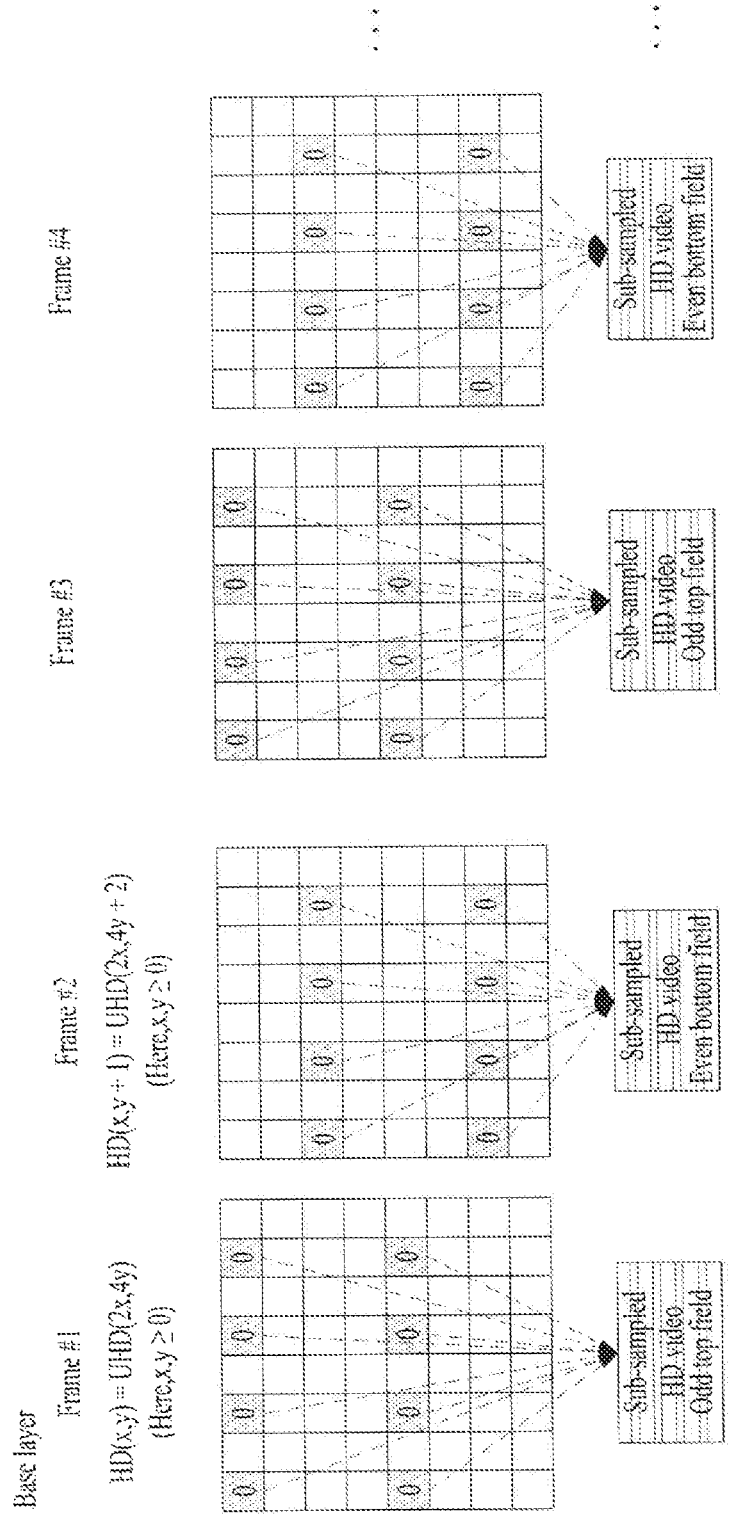
FIG. 7 illustrates another example of converting a UHD video signal into an HD video signal in detail.

FIG. 7 illustrates another example of converting UHD video data into HD video data in detail. This figure shows another example of directly converting the video data (3840×2160@60p) into the HD video data (1920×1080@600.

For example, when the UHD video data (3840×2160@60p) are down-sampled into the HD video data (1920×1080@60i), all frames are selected as down-sampling targets. When sub-sampling is performed, a pixel HD (x, y) of the odd top field of an HD video frame can be determined using a pixel UHD (2x, 2y) in the UHD video frame (frame #1), and a pixel UHD (2x, 4y+2) in the next UHD video frame (frame #2) can be determined as a pixel HD (x, y+1) of the even bottom field of the HD video frame. Similarly, the odd top field and even bottom field of the HD video frame can be determined using UHD video frames #3 and #4.

While a top field can be generated in an odd frame and a bottom field can be generated in an even frame in order to generate 60 interlaced fields from 60 UHD source video frames in this example, the bottom field may be generated in an odd frame and the top field may be generated in an even frame. That is, a top field or a bottom field of an HD video frame can be generated from every UHD video frame.

Accordingly, the UHD video data (3840×2160@60p) can be directly converted into the HD video data (1920×1080@60i) and the converted frames can be encoded into a base layer and transmitted.

Method for separating an HD video frame from a UHD video frame may include a method for sampling the UHD video frame to the HD video frame and then separating interlaced fields from the HD video frame, as shown in FIGS. 4 and 5. Further, the method may include a method for sampling the UHD video frame to the HD video frame and, simultaneously, separating interlaced frames from the HD video frame, as shown in FIGS. 6 and 7.

While a corresponding pixel of the HD video frame is generated using one pixel of the UHD video frame in FIGS. 6 and 7, HD video pixels may be generated using the weighted sum of N arbitrary pixels. That is, down-sampling for extracting the HD video frame from the UHD video frame can be normalized and represented as Equation 1.

$$HD(x, y) = \frac{1}{(N1 + N2 + 1) * (N3 + N4 + 1)} \sum_{i=-N1}^{i=+N2} \sum_{j=-N2}^{j=+N4} w(i, j) * UD(2x + i, 2y + j)$$ [Equation 1]

Figure 8:
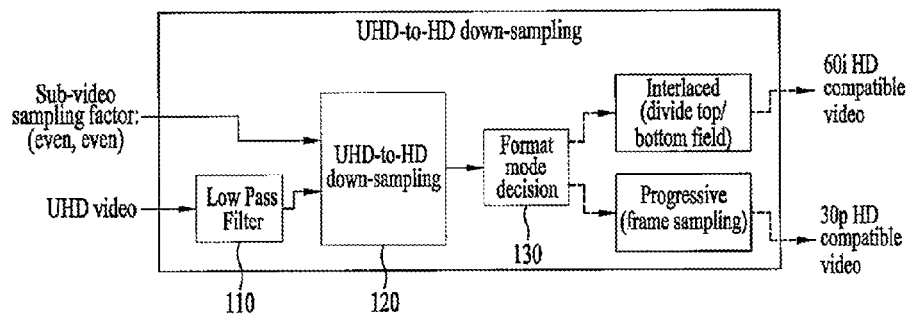
FIG. 8 illustrates an embodiment of a transmission apparatus capable of transmitting a UHD video signal as an HD video signal.

FIG. 8 illustrates an embodiment of a transmission apparatus capable of transmitting a UHD video signal as an HD video signal. When the UHD video signal, is input, the UHD video signal is selectively filtered through a low pass filter 110 and a sub-video sampling factor is input to a down-sampling unit 120. This figure shows an example of classifying HD video data according to scan methods when the sub-video sampling factor is an (even, even) combination. Accordingly, other sub-video sampling factors can be used. The down-sampling unit 120 down-samples the filtered UHD video signal to an HD video signal. Down-sampling methods are illustrated in FIGS. 3 and 4.

A format decision unit 130 may determine whether a video format is interlaced or progressive according to scan method for the down-sampled video. The format decision unit 130 may generate 60i HD video frames by separating top/bottom fields according to scan method and/or 30p HD video frames sampled on a frame basis and insert an interlaced flag and a progressive flag into the generated video frame.

In the case of the examples of FIGS. 6 and 7, the down-sampling unit 120 and the format decision unit 130 can operate in the same functional block to simultaneously perform down-sampling and format conversion according to the above-described equation.

The video transmission apparatus according to an embodiment of the present invention may further include a signaling unit (not shown) for generating signaling information associated with the HD video signal converted from the UHD video signal and a transmission unit (not shown) for simultaneously transmitting the converted HD video signal and the generated signaling information, when the HD video signal converted from the UHD video signal is transmitted as a broadcast signal.

A description will be given of a reception apparatus capable of receiving a video signal and signaling information.

Figure 9:
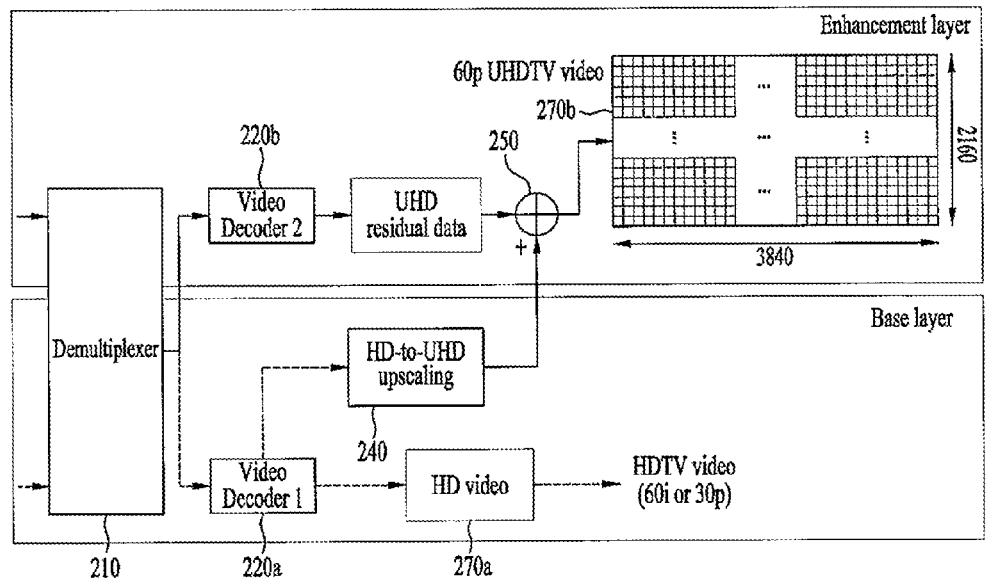
FIG. 9 illustrates a video reception apparatus according to an embodiment of the present invention.

FIG. 9 illustrates a video reception apparatus according to an embodiment of the present invention. The video reception apparatus according to the present invention can reproduce a UHD video and an HD video according to the aforementioned video structures.

A video reception apparatus according to a first embodiment of the present invention may include a demultiplexer 210, a video decoder 220a and a video output unit 270. A video reception apparatus according to a second embodiment of the present invention may include the demultiplexer 210, video decoders 220a and 220b, an up-scaling unit 240, a video conversion unit 250 and video output units 270a and 270b.

The video reception apparatuses according to the embodiments can receive and reproduce HD video signals of a base layer and UHD video signals of a base layer and an enhancement layer. The embodiments correspond to an example of a UHD video receiver compatible with HD video signals.

The video reception apparatus for reproducing HD video signals of a base layer according to the first embodiment will now be described first. Since the video reception apparatus according to the first embodiment cannot recognize an enhancement layer and recognizes only the HD video signals of the base layer, the video reception apparatus receives only HD broadcast signals even when connected to a UHDTV broadcast channel.

The demultiplexer 210 demultiplexes a video stream of the base layer. The video stream of the base layer may have a format of 1920×1080@60i or 1920×1080@30p. The video decoder 220a may decode the demultiplexed video stream of the base layer and the video output unit 270a may output the decoded video stream of the base layer.

In the video reception apparatus according to the second embodiment, the demultiplexer 210 may demultiplex and output the video stream. The up-scaling unit 240 may up-scale the video stream in the format of 1920×1080@60i or 1920×1080@30p, decoded by the video decoder 220a. Up-scaling may conform to the methods illustrated in FIGS. 3 and 4.

The demultiplexer 210 may demultiplex a video stream of an enhancement layer and the video decoder 220b may decode UHD residual data of the demultiplexed enhancement layer.

The video conversion unit 250 may generate UHD video data (e.g. 3840×2160@60p) by summing the video data UHD-up-scaled by the up-scaling unit 240 and the UHD residual data decoded by the video decoder 220b.

The present embodiment illustrates a case in which the HD video 1920×1080@60i or 1920×1080@30p is reproduced as the UHD video 3840×2160@60p. In the case of 8K UHD video (7680×4320), reproduction can be performed in the same manner with a different up-scaling size. The video output unit 270b may output the UHD video summed by the video conversion unit 250.

A signaling unit (not shown), which decodes signaling information for signaling the aforementioned configuration, may be included in the video reception apparatus. When the signaling information is transmitted as a broadcast stream or an additional stream, a receiver can recognize the configuration of a corresponding broadcast signal using the signaling information and decode the broadcast signal on the basis of the configuration thereof. A description will be given of the signaling information.

A configuration of a compatible broadcast signal which can be received by both an HD broadcast receiver and a UHD broadcast receiver will now be described.

Figure 10:
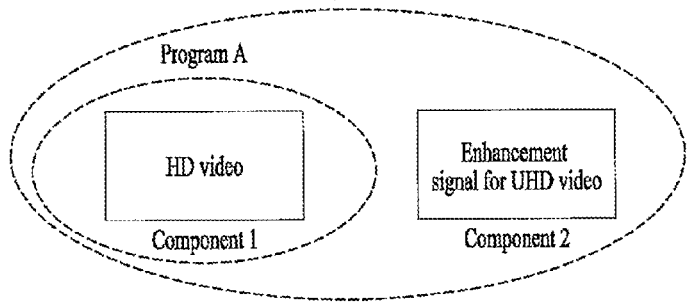
FIG. 10 illustrates an exemplary structure of a compatible broadcast signal that can be received by both an HD broadcast receiver and a UHD broadcast receiver.

FIG. 10 illustrates an exemplary configuration of a compatible broadcast signal which can be received by both the HD broadcast receiver and the UHD broadcast receiver. A description will be given of an example of the configuration of a compatible broadcast signal which can be received by both the HD broadcast receiver and the UHD broadcast receiver with reference to FIG. 10.

Program A may be referred to as service A or channel A and program B may be referred to as service B or channel B.

Program A corresponding to an HD program and program B corresponding to a UHD program may be respectively transmitted as separate programs or separate broadcast signals. For example, program A corresponding to the HD program and program B corresponding to the UHD program can be respectively transmitted as separate streams or separate broadcast signals.

In this case, the HD broadcast receiver can receive HD program A and the UHD broadcast receiver can receive the UHD program B.

According to another embodiment, HD program A and the UHD program B are not transmitted as separate programs and part of components of the UHD program may become components of the HD program. Examples of broadcast video components included in programs will now be described.

Program A may include an HD video component (component 1) and program B may include the HD video component (component 1) and an enhancement video component (component 2) for UHD video. Accordingly, the HD program can correspond to part of the elements or components of the UHD program.

In this case, the UHD receiver can receive both HD video component 1 and enhancement video component 2 and reproduce a UHD video signal using both components.

Accordingly, the HD broadcast receiver receives HD video component 1 and the UHD video receiver receives both HD video component 1 and UHD video component 2.

Signaling information used for a broadcast receiver to receive an element or a component will now be described.

Figure 11:
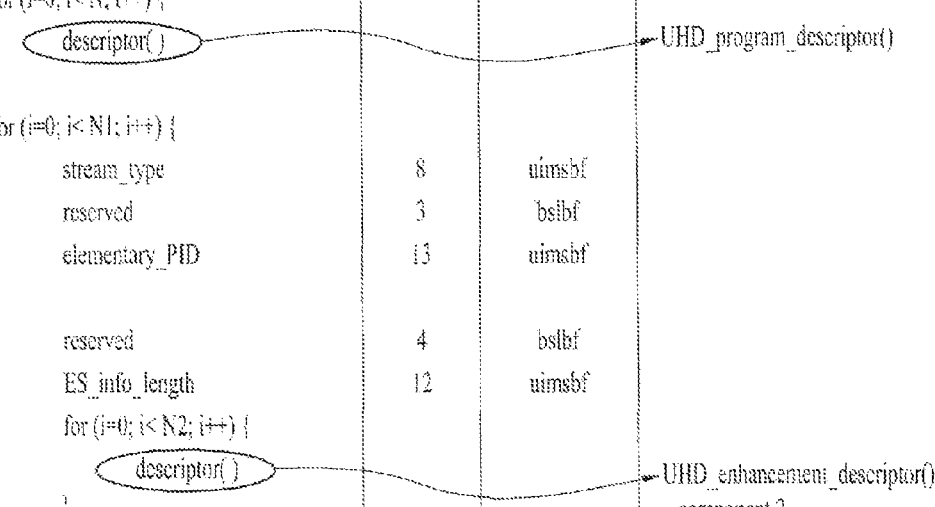
FIG. 11 illustrates a PMT as signaling information.

FIG. 11 shows a PMT as the signaling information. An example of signaling a UHD video signal configuration will now be described with reference to FIG. 11

The PMT may conform to the contents disclosed in ISO/IEC 13818-1. Fields of the PMT will now be described using the contents of ISO/IEC 13818-1.

table_id field represents an 8-bit identifier that indicates the type of the PMT section. (table_id—This is an 8-bit field, which in the case of a TS_program_map_section shall be always set to 0x02.)

section_syntax_indicator field is a 1-bit field set to 1 for a VCT section. (section_syntax_indicator—The section_syntax_indicator is a 1-bit field which shall be set to '1'.)

section_length field indicates the length of the corresponding section. (section_ length—This is a 12-bit field, the first two bits of which shall be '00'. The remaining 10 bits specify the number of bytes of the section starting immediately following the section_length field, and including the CRC.)

program_number field indicates a program to which program_map_PID is applicable. (program_number—program_number is a 16-bit field. It specifies the program to which the program_map_PID is applicable. One program definition shall be carried within only one TS_program_map_section. This implies that a program definition is never longer than 1016 (0x3F8). See Information Annex C for ways to deal with the cases when that length is not sufficient. The program_number may be used as a designation for a broadcast channel, for example. By describing the different program elements belonging to a program, data from different sources (e.g. sequential events) can be concatenated together to form a continuous set of streams using a program_number.)

version_number field indicates the number of a VCT version. (version_number—This 5-bit field is the version number of the TS_program_map_section. The version number shall be incremented by 1 modulo 32 when a change in the information carried within the section occurs. Version number refers to the definition of a single program, and therefore to a single section. When the current_next_indicator is set to '1', then the version_number shall be that of the currently applicable TS_program_map_section. When the current_next_indicator is set to '0', then the version_number shall be that of the next applicable TS_program_map_section.)

current_next_indicator field indicates whether the PMT is applicable currently or next. (current_next_indicator—A 1-bit field, which when set to '1' indicates that the TS_program_map_section sent is currently applicable. When the bit is set to '0', it indicates that the TS_program_map_section sent is not yet applicable and shall be the next TS_program_map_section to become valid.)

section_number field indicates the number of the corresponding section. (section_number—The value of this 8-bit field shall be 0x00.)

last_section_number field indicates the number of the last section. (last_section_number—The value of this 8-bit field shall be 0x00.)

PCR_PID indicates the PID of a TS packet including a PCR field of a program specified by the program number. (PCR_PID—This is a 13-bit field indicating the PID of the Transport Stream packets which shall contain the PCR fields valid for the program specified by program_number. If no PCR is associated with a program definition for private streams, then this field shall take the value of 0x1FFF.)

program_info_length field indicates the length of a program level descriptor immediately following this field. (program_info_length—This is a 12-bit field, the first two bits of which shall be '00'. The remaining 10 bits specify the number of bytes of the descriptors immediately following the program_info_length field.)

stream_type field indicates the type of a program element stream. (stream_type—This is an 8-bit field specifying the type of program element carried within the packets with the PID whose value is specified by the elementary_PID.)

elementary_PID field designates the PID of a TS packet which carries an associated program element. (elementary_PID—This is a 13-bit field specifying the PID of the Transport Stream packets which carry the associated program element.)

ES_info_length field indicates the length of a program element level descriptor. (ES_info_length—This is a 12-bit field, the first two bits of which shall be '00'. The remaining 10 bits specify the number of bytes of the descriptors of the associated program element immediately following the ES_info_length field.)

CRC 32 field indicates a 32-bit field including a CRC value. (CRC_32—This is a 32-bit field that contains the CRC value that gives a zero output of the registers in the decoder.)

The PMT may include a program level descriptor and an elementary stream level descriptor.

In the PMT, a descriptor that signals the UHD program and the HD program may include a program level descriptor. In the present embodiment, the program descriptor is represented as UHD_program_descriptor. Characteristics of the UHD program can be signaled using UHD_program_descriptor immediately following program_info_length field of the PMT.

The PMT may include an elementary stream level descriptor for signaling elements or components of the UHD program or the HD program. In the present embodiment, the elementary stream level descriptor is represented as UHD_enhancement_descriptor. Characteristics of elementary streams or components can be signaled using the elementary stream level descriptor immediately following ES_info_length field.

The two descriptors will now be described in detail.

In the case of program B in FIG. 10, two video components can be signaled through the PMT. For example, component 1 which is an HD video component can be signaled as a stream type such as MPEG-2, H.264/AVC, HEVC or the like. An enhancement video component can be signaled as a stream type value that indicates the enhancement video component as stream_type.

The enhancement video component can designate a compression codec for component 2. For example, the enhancement video component can be a stream type value that indicates an AVC/SVC stream, an HEVC scalable extension stream, a stream acquired by coding a hybrid delta stream through AVC and a stream acquired by coding the hybrid delta stream using HEVC.

Here, hybrid delta refers to a case in which a codec, which is different from a codec used to compress a base layer video signal (component 1), is used for enhancement video data with respect to the base layer video signal (component 1). That is, when component 1 with respect to an HD signal is encoded according to MPEG-2 video and component 2 with respect to an enhancement layer for UHD video is encoded through HEVC, the component 2 is called a hybrid delta HEVC stream.

When component 2 is encoded or decoded using hybrid delta, an encoder or a decoder can encode or decode component 2 using a result of component 1. If a base layer signal is an MPEG-2 video stream and an enhancement layer signal is a stream coded through HEVC, the base layer signal can be decompressed and then up-scaled according to a UHD signal. In addition, the enhancement layer signal compressed through HEVC can be decompressed and then combined with the up-scaled MPEG-2 video signal to finally output a UHD video signal.

FIG. 12 illustrates stream type values of streams according to an embodiment of the present invention. For example, a stream using an AVC/SVC codec can have a stream type value of 0x30.

FIG. 13 illustrates a UHD program descriptor according to an embodiment of the present invention. An exemplary UHD program descriptor will now be described with reference to FIG. 13. The UHD program descriptor may indicate that the corresponding program is a UHD program and include information on transmission structures of two layers (base layer and enhancement layer). The UHD program descriptor may immediately follow program_info_length of the PMT.

The UHD program descriptor can include descriptor_tag field which is a descriptor identifier and a descriptor_length field which indicates the length of the descriptor.

UHD_video_type field signals information on a UHD video format and indicates information representing whether the video type is 4K or 8K. This will be described below in detail with reference to FIG. 14.

UHD_sub_service_type field indicates information on compatibility of a UHD service with HD and a UHD service transmission structure. This will be described below in detail with reference to FIG. 15.

FIG. 14 illustrates values of the aforementioned UHD_video_type field and description thereof. FIG. 14 shows values of UHD_video_type field and video formats according to the respective values. For example, when UHD_video_type field is 001, UHD_video_type field indicates video resolution of 3840×2160 and 60 progressive HD video frame (3840×2160@60p) per unit time.

FIG. 15 illustrates values of the aforementioned UHD_sub_service_type field and description thereof. For example, when UHD_sub_service_type field is 0x01, this value indicates that the UHD service is not compatible with HD video. In the case of hybrid delivery, video streams constituting a UHD service are transmitted through a different transmission path or protocol. For example, a base layer is transmitted in-band and an enhancement layer is received through a different path/protocol such as the Internet in real-time, Internet download, in-band non-real-time or the like.

FIG. 16 illustrates an example of the aforementioned UHD_enhancement_descriptor. The UHD enhancement descriptor can signal information on an elementary stream corresponding to an enhancement layer and immediately follows ES_info_length field of the PMT.

UHD_enhancement_descriptor can include descriptor_tag which is a descriptor identifier and a descriptor_length field which indicates the length of the descriptor.

UHD_enhancement_descriptor can include UHD_video_type field which indicates information on a UHD video format and an upscale_parameter_included field which indicates an upscaling parameter.

For example, UHD_video_type field signals information on a UHD video format and indicates information representing whether video is 4K or 8K. UHD_video_type field may have the same values as shown in FIG. 14.

Upscale_parameter_included field indicates whether an upscale parameter, which needs to be applied to the base layer prior to combination of the base layer with the enhancement layer, is included in an enhancement layer video stream. The decoder can perform upscaling on the base layer at UHD level using the upscale parameter.

FIG. 17 illustrates a VCT as signaling information according to an embodiment of the present invention. An example of signaling a UHD video signal configuration will now be described with reference to FIG. 17.

The VCT can conform to ATSC PSIP. According to ATSC PSIP, fields of the VCT are as follows. Each bit will now be described.

table_id field indicates an 8-bit unsigned integer that refers to the type of the corresponding table section. (table_id—An 8-bit unsigned integer number that indicates the type of table section being defined here. For the terrestrial_virtual_channeltable_section( ) the table_id shall be 0xC8.)

section_syntax_indicator field is a 1-bit field set to 1 for the VCT section. (section_syntax_indicator—The section_syntax_indicator is a one-bit field which shall be set to '1' for the terrestrial_virtual_channel_table_section ( ).)

private_indicator field is set to 1. (private_indicator—This 1-bit field shall be set to '1').

section_length field indicates a section length in bytes. (section_length—This is a twelve bit field, the first two bits of which shall be '00'. If specifies the number of bytes of the section, starting immediately following the section_length field, and including the CRC.)

transport_stream_id field indicates an MPEG-TS ID as in the PAT that can identify TVCT. (transport_stream_id—The 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.)

version_number field indicates the version number of the VCT. (version_number—This 5-bit field is the version number of the Virtual Channel Table. For the current VCT (current_next_indicator='1'), the version number shall be incremented by 1 whenever the definition of the current VCT changes. Upon reaching the value 31, it wraps around to 0. For the next VCT (current_next_indicator='0'), the version number shall be one unit more than that of the current VCT (also in modulo 32 arithmetic). In any case, the value of the version_number shall be identical to that of the corresponding entries in the MGT.)

current_next_indicator field indicates whether the VCT is applicable currently or next. (current_next_indicator—A one-bit indicator, which when set to '1' indicates that the Virtual Channel Table sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field.)

section_number field indicates the number of the corresponding section. (section_number—This 8-bit field gives the number of this section. The section_number of the first section in the Terrestrial Virtual Channel Table shall be 0x00. It shall be incremented by one with each additional section in the Terrestrial Virtual Channel Table.)

last_section_number field indicates the number of the last section. (last_section_number—This 8-bit field specifies the number of the last section (that is, the section with the highest section_number) of the complete Terrestrial Virtual Channel Table.)

protocol_version field indicates a protocol version for parameters that will be structured differently than those defined in the current protocol. (protocol_version—An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

num_channels_in_section field indicates the number of virtual channels of the VCT. (num_channels_in_section—This 8-bit field specifies the number of virtual channels in this VCT section. The number is limited by the section length.)

short_name field indicates the name of a virtual channel. (short_name—The name of the virtual channel, represented as a sequence of one to seven 16-bit code values interpreted in accordance with the UTF-16 representation of Unicode character data. If the length of the name requires fewer than seven 16-bit code values, this field shall be padded out to seven 16-bit code values using the Unicode NUL character (0x0000). Unicode character data shall conform to The Unicode Standard, Version 3.0 [13].)

major_channel_number field indicates the number of major channels associated with the virtual channels. (major_channel_number—A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT. For major_channel_number assignments in the U.S., refer to Annex B.)

minor_channel_number field indicates the number of minor channels associated with the virtual channels. (minor_channel_number—A 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0. Services whose service_type is ATSC_digital television, ATSC_audio_only, or unassociated/small screen service shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers area between 1 and 999.)

modulation_mode field indicates a modulation mode of carriers associated with the virtual channels. (modulation_mode—An 8-bit unsigned integer number that indicates the modulation mode for the transmitted carrier associated with this virtual channel. Values of modulation_mode shall be as defined in Table 6.5. For digital signals, the standard values for modulation mode (values below 0x80) indicate transport framing structure, channel coding, interleaving, channel modulation, forward error correction, symbol rate, and other transmission-related parameters, by means of a reference to an appropriate standard. The modulation_mode field shall be disregarded for inactive channels.)

carrier_frequency field is a field capable of identifying a carrier frequency. (carrier_frequency—The recommended value for these 32 bits is zero. Use of this field to identify carrier frequency is allowed, but is deprecated.)

channel_TSID field indicates an MPEG-2 TS ID associated with a TS carrying the MPEG-2 program referenced by this virtual channel. (channel_TSID—A 16-bit unsigned integer field in the range 0x0000 to 0xFFFF that represents the MPEG-2 Transport Stream ID associated with the Transport Stream carrying the MPEG-2 program referenced by this virtual channel. For inactive channels, channel_TSID shall represent the ID of the Transport Stream that will carry the service when it becomes active. The receiver is expected to use the channel_TSID to verify that any received Transport Stream is actually the desired multiplex. For analog channels (service_type 0x0), channel_TSID shall indicate the value of the analog TSID included in the VBI of the NTSC signal. Refer to Annex D section 9 for a discussion on use of the analog TSID.)

program_number field indicates an integer value defined with respect to the corresponding virtual channel and the PMT. (program_number—A 16-bit unsigned inter number that associates the virtual channel being defined here with the MPEG-2 PROGRAM ASSOCIATION and TS PRGRAM MAP tables. For virtual channels representing analog services, a value of 0xFFFF shall be specified for program_number. For inactive channels (those not currently present in the Transport Stream), program_number shall be set to zero. This number shall not be interpreted as pointing to a Program Map Table entry.)

ETM_location field indicates presence and location of an ETM. (ETM_location—This 2-bit field specifies the existence and the location of an Extended Text Message (ETM) and shall be as defined in Table 6.6.)

access_controlled field indicates an event associated with an access-controlled virtual channel. (access_controlled—A 1-bit Boolean flag that indicates, when set, that the events associated with this virtual channel may be access_controlled. When the flag is set to '0', event access is not restricted.)

hidden field indicates a case in which the virtual channel is not accessed by a direct channel input of the user. (hidden—a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.)

hide_guide channel indicates whether the virtual channel and the event thereof can appear in an EPG. (hide_guide—A Boolean flag that indicates, when set to '0' for a hidden channel, that the virtual channel and its events may appear in EPG display. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.)

service_type field indicates a service type identifier. (service_type—This 6-bit field shall carry the Service Type identifier. Service Type and the associated service_type field are defined in A/53 Part 1 [1] to identify the type of service carried in this virtual channel. Value 0x00 shall be reserved. Value 0x01 shall represent analog television programming. Other values are defined in A/53 Part 3 [3], and other ATSC Standard may define other Service Types9.)

source_id field is a number that identifies the programming source associated with the virtual channel. (source_id—A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source ids 0x1000 and above shall be issued and administered by a Registration Authority designated by the ATSC.)

descriptor_length field indicates the length of the following descriptor. (descriptor_length—Total length (in bytes) of the descriptors for this virtual channel that follows.)

The descriptor can be included in descriptor( ).

Descriptor( )—Zero or more descriptors, as appropriate, may be included.

additional-descriptors_length—Total length (in bytes) of the VCT descriptor list that follows.

CRC 32 is a 32-bit field including a CRC value. (CRC_32—This is a 32-bit field that contains the CRC value that ensures a zero output from the registers in the decoder.)

The VCT can include service_type that indicates services associated with UHD broadcast and a descriptor that describes the services associated with UHD broadcast. For example, service_type field can have a field value (e.g. 0x07) indicating a parameterized service, a field value (e.g.

0x09) indicating an extended parameterized service or a field value (e.g. 0x10) indicating a new DTV service.

A descriptor that describes a UHD program and components thereof can be located following descriptor_length.

FIG. 18 illustrates a descriptor that can be included in the VCT according to an embodiment of the present invention. A description will be given of the descriptor that can be included in the VCT with reference to FIG. 18. In this example, the descriptor that can be included in the VCT is referred to as UHD_component_descriptor.

UHD_component_descriptor can include descriptor_tag that is the identifier of the descriptor and descriptor_length field that indicates the length of the descriptor.

Num_of_component indicates the number of components included in the corresponding UHD service.

UHD_component_descriptor may include UHD_video_codec_type, UHD_video_profile, UHD_video_resolution, UHD_video_frame_rate and UHD_component_type fields per component.

UHD_video_codec_type field indicates a codec for video elements constituting the UHD service. For example, this value can indicate the same codec as that indicated by stream_type of the PMT.

UHD_video_profile field indicates a profile for a corresponding video stream, that is, a basic tool necessary to decode the corresponding video stream. UHD_video_profile can indicate requirement information about a color depth (4:2:0, 4:2:2), bit depth (8-bit, 10-bit), coding tool and the like of the corresponding video stream. UHD_video_level indicates maximum specifications that can be decoded in the corresponding profile. That is, UHD_video_profile field can provide level information corresponding to UHD_video_resolution field and UHD_video_frame_rate.

UHD_video_resolution field and UHD_video_frame_rate field indicate a frame rate and resolution of UHD video. For example, when UHD_video_resolution is '001', this value can indicate resolution of 3840×2160. When UHD_video_frame_rate is '010', this value can indicate progressive 60 Hz. UHD_video_resolution field and UHD_video_frame_rate field can have the same meaning and values as those of UHD_video_type field of UHD_program_descriptor included in the aforementioned PMT.

UHD_component_type field can indicate information representing whether the corresponding video stream is an HD compatible base layer or an enhancement layer for UHD.

A description will be given of an example of signaling a UHD video compatible with an HD video using the aforementioned information through DVB SI.

FIG. 19 illustrates an SDT as signaling information.

The SDT can conform to ETSI EN 300 468. Respective fields of the SDT will now be described using ETSI EN 300 468.

table_id field indicates the identifier of the table.

section_syntax_indicator field is a 1-bit field set to 1 for the SDT section. (section_syntax_indicator: This section_syntax_indicator is a 1-bit field which shall be set to "1".)

section_length field indicates the length of the section in bytes. (section_length: This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

transport_stream_id field indicates a TS identifier provided by the SDT, distinguished from any other multiplex in the transmission system. (transport_stream_id: This is a 16-bit field which serves as a label for identification of the TS, about which the SDT informs, from any other multiplex within the delivery system.)

version_number field indicates the version number of the sub-table. (version_number: This 5-bit field is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.)

current_next_indicator field indicates whether the sub-table is applicable currently or next. (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.)

section_number field indicates the number of the corresponding section. (section_number: This 8-bit field gives the number of the section. The section_number of the first section in the sub_table shall be "0x00". The section_number shall be incremented by 1 with each additional section with the same table_id, transport_stream, and original_network_id.)

last_section_number field indicates the number of the last section. (last_section_number: This 8-bit field specifies the number of the last section (that is, the section with the highest section_number) of the sub_table of which this section is part.)

original_network_id field identifies the network ID of the transmission system. (original_network_id: This 16-bit field gives the label identifying the network_id of the originating delivery system.)

service_id field indicates a service identifier in the corresponding TS. (service_id: This is a 16-bit field which serves as a label to identify this service from any other service within the TS. The service_id is the same as the program_number in the corresponding program_map_section.)

EIT_schedule_flag field indicates whether EIT schedule information about a corresponding service is present in the current TS. (EIT_schedule_flag: This is a 1-bit field which when set to "1" indicates that EIT schedule information for the service is present in the current TS, see TR 101 211 [i.2] for information on maximum time interval between occurrences of an EIT schedule sub_table. If the flag is set to 0 then the EIT schedule information for the service should not be present in the TS.)

EIT_present_following_flag field indicates whether EIT_present_following information about the service is present in the current TS. (EIT_present_following_flag: This is a 1-bit field which when set to "1" indicates that EIT_present_following information for the service is present in the current TS, see TR 101 211 [i.2] for information on maximum time interval between occurrences of an BIT present/following sub_table. If the flag is set to 0 then the EIT present/following information for the service should not be present in the TS.)

running_status field indicates the status of the service as defined in table 6 of DVB-SI. (running_status: This is a 3-bit field indicating the status of the service as defined in table 6. For an NVOD reference service the value of the running_status shall be set to "0".)

free_CA_mode field indicates whether all component streams of the service are scrambled. (free_CA_mode: This 1-bit field, when set to "1" indicates that all the component streams of the service are not scrambled. When set to "1" it indicates that access to one or more streams may be controlled by a CA system.)

descriptors_loop_length field indicates the length of the following descriptor. (descriptors_loop_length: This 12-bit field gives the total length in bytes of the following descriptors.)

CRC_32 is a 32-bit field including a CRC value. (descriptors_loop_length: This 12-bit field gives the total length in bytes of the following descriptors.)

UHD_program_descriptor illustrated in FIG. 13 can be located at the service level of the SDT to signal UHD video characteristics and transmission structure with respect to the corresponding service. In addition, UHD_component_descriptor illustrated in FIG. 18 can be located at the service level of the SDT to signal characteristics of UHD elements included in the corresponding service.

FIG. 20 illustrates an EIT as signaling information.

The EIT can conform to ETSI EN 300 468. Respective fields of the EIT will now be described using ETSI EN 300 468.

table_id field indicates a table identifier.

section_syntax_indicator field is a 1-bit field set to 1 for the EIT section. (section_syntax_indicator: The section_syntax_indicator is a 1-bit field which shall be set to "1".)

section_length field indicates the length of the section in bytes. (section_length: This is a 12-bit field. It specifies the number of bytes of the section, starting immediately following the section_length field and including the CRC. The section_length shall not exceed 4093 so that the entire section has a maximum length of 4096 bytes.)

service_id field indicates a service identifier in a TS. (service_id: This is a 16-bit field which serves as a label to identify this service from any other service within a TS. The service_id is the same as the program_number in the corresponding program_map_section.)

version_number field indicates the version number of the sub-table. (version_number: This 5-bit field is the version number of the sub_table. The version_number shall be incremented by 1 when a change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.)

current_next_indicator field indicates whether the sub-table is applicable currently or next. (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.)

section_number field indicates the number of the section. (section_number: This 8-bit field gives the number of the section. The section_number of the first section in the sub_table shall be "0x00". The section_number shall be incremented by 1 with each additional section with the same table_id, service_id, transport_stream_id, and original_network_id. In this case, the sub_table may be structured as a number of segments. Within each segment the section_number shall increment by 1 with each additional section, but a gap in numbering is permitted between the last section of a segment and the first section of the adjacent segment.)

last_section_number field indicates the number of the last section. (last_section_number: This 8-bit field specifies the number of the last section (that is, the section with the highest section_number) of the sub_table of which this section is part.)

transport_stream_id field indicates a TS identifier provided by the SDT, distinguished from any other multiplex within the transmission system. (transport_stream_id: This is a 16-bit field which serves as a label for identification of the TS, about which the EIT informs, from any other multiplex within the delivery system.)

original_network_id field identifies the network ID of the transmission system. (original_network_id: This 16-bit field gives the label identifying the network_id of the originating delivery system.)

segment_last_section_number field indicates the number of the last section of this segment of the sub-table. (segment_last_section_number: This 8-bit field specifies the number of the last section of this segment of the sub_table. For sub_tables which are not segmented, this field shall be set to the same value as the last_section_number field.)

last_table_id field is an 8-bit field that identifies the last table ID used (see table 2). (last_table_id: This 8-bit field identifies the last_table_id used (see table 2).)

event_id field indicates the identification number of the described event. (event_id: This 16-bit field contains the identification number of the described event (uniquely allocated within a service definition.)

start_time field includes the start time of the event. (start_time: This 40-bit field contains the start time of the event in Universal Time, Co-ordinated (UTC) and Modified Julian Date (MJD) (see Annex C). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "1".)

running_status field indicates the status of the event as defined in table 6 of DVB SI. (running_status: This is a 3-bit field indicating the status of the event as defined in table 6. For an NVOD reference event the value of the running_status shall be set to "0".)

free_CA_mode field indicates whether all component streams of the service are scrambled. (free_CA_mode: This 1-bit field, when set to "0" indicates that all the component streams of the event are not scrambled. When set to "1" it indicates that access to one or more streams is controlled by a CA system.)

descriptors_loop_length field indicates the length of the following descriptor. (descriptors_loop_length: This is 12-bit field gives the total length in bytes of the following descriptors.)

CRC_32 is a 32-bit field including a CRC value. (CRC_32: This is a 32-bit field that contains the CRC value that gives a zero output of the registers in the decoder.)

UHD_program_descriptor illustrated in FIG. 13 and UHD_component_descriptor illustrated in FIG. 18 can be located at the event level of the EIT to signal UHD video characteristics and transmission structure with respect to the UHD program and characteristics of UHD elements included in the UHD service per event.

When UHD_component_descriptor illustrated in FIG. 18 is included in the SDT or EIT of DVB, UHD_component_descriptor may further include a component_tag field. The component_tag field can indicate a PID value for the corresponding stream signaled through the PMT at the PSI level. The receiver can detect the PID value of the corresponding stream along with the PMT using the component_tag field.

Figure 21:
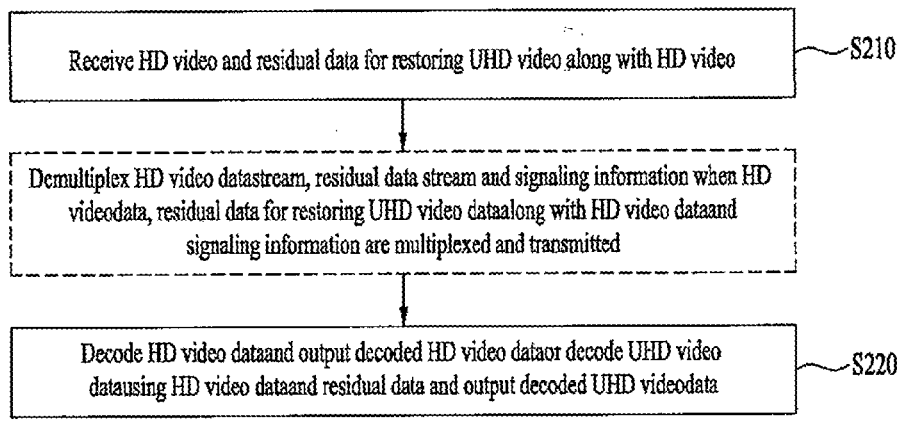
FIG. 21 illustrates a method for receiving a broadcast signal according to an embodiment of the present invention.

FIG. 21 illustrates a method for receiving a broadcast signal according to an embodiment of the present invention. An embodiment of the method for receiving a broadcast signal according to the present invention will now be described.

HD video data is received, and residual data that can restore UHD video data along with the HD video data is received (S210).

The HD video data is decoded and output or the UHD video data is restored using the HD video data and the residual data and output (S220). S210 and S220 have been described in detail with reference to FIG. 9.

According to the method for receiving a broadcast signal according to an embodiment of the present invention, signaling information may be received and S220 may be performed using the signaling information. The signaling information has been described with reference to FIGS. 10 to 20.

When the HD video data, the residual data used to restore the UHD video data along with the HD video data, and the signaling information are multiplexed and transmitted, an HD video stream, a residual data stream and the signaling information can be respectively demultiplexed.

The demultiplexed signaling information can be decoded and the demultiplexed HD video stream can be restored according to the decoded signaling information or the UHD video signal can be restored using the demultiplexed HD video stream and residual data stream.

Figure 22:
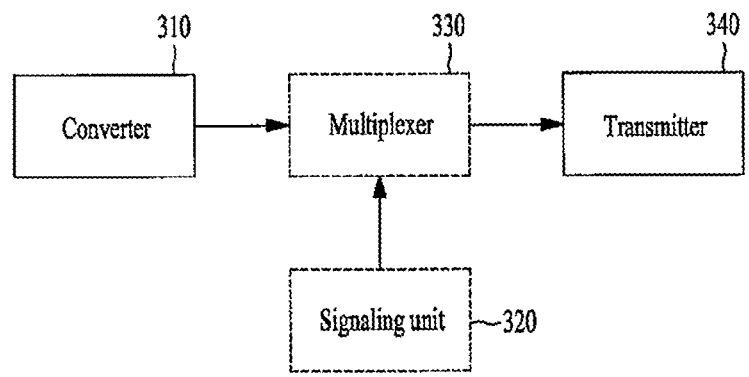
FIG. 22 illustrates an apparatus for transmitting a signal according to an embodiment of the present invention.

FIG. 22 illustrates an apparatus for transmitting a signal according to an embodiment of the present invention.

The apparatus for transmitting a signal according to an embodiment of the present invention may include a converter 310 and a transmitter 340.

The converter 310 converts UHD video data into HD video data.

For example, when UHD video data is converted into HD video data, the converter 310 can convert UHD video data of a first frame rate into progressive HD video data of the first frame rate and convert the converted first frame rate progressive HD video data into progressive HD video data of a second frame rate corresponding to half the first frame rate or into interlaced HD video data of the first frame rate.

In conversion of UHD video data into HD video data, the converter 310 may convert UHD video data of a first frame rate into progressive HD video data of a second frame rate corresponding to half the first frame rate or into interlaced HD video data of the first frame rate.

An embodiment of converting the UHD video data into the HD video data has been described with reference to FIG. 3. The embodiment illustrated in FIG. 3 has been described in detail with reference to FIGS. 4 to 8.

The transmitter 340 transmits the HD video data converted by the converter 310 and the residual data used to restore the UHD video data along with the converted HD video data.

The apparatus for transmitting a signal according to an embodiment of the present invention may further include a signaling unit 320 and a multiplexer 330. The signaling unit 320 generates signaling information used to restore the UHD video data using the transmitted HD video data and residual data of the HD video data. The signaling information has been described in detail with reference to FIGS. 10 to 20.

The multiplexer 330 multiplexes the HD video data converted by the converter 310, the residual data and the signaling information generated by the signaling unit 330.

The transmitter 340 can transmit the signal multiplexed by the multiplexer 330.

Figure 23:
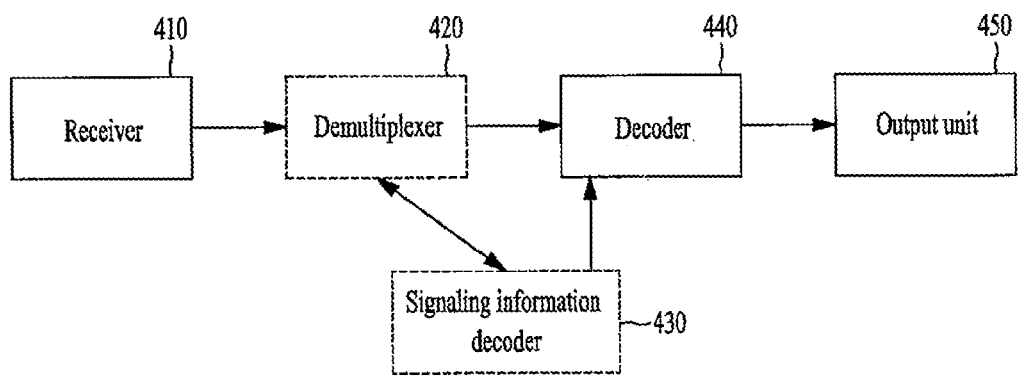
FIG. 23 illustrates an apparatus for receiving a signal according to an embodiment of the present invention.

FIG. 23 illustrates an apparatus for receiving a signal according to an embodiment of the present invention.

The apparatus for receiving a signal according to an embodiment of the present invention may include a receiver 410, a decoder 440 and an output unit 450.

The receiver 410 receives HD video data and residual data used to restore corresponding UHD video data along with the residual data.

The decoder 440 may decode the HD video data or decode the UHD video data using the HD video data and the residual data.

The output unit 450 may decode the HD video data or restore the UHD video data using the HD video data and the residual data. The decoder 440 and the output unit 450 have been described in detail with reference to FIG. 9.

The apparatus for receiving a signal according to an embodiment of the present invention may further include a demultiplexer 420 and a signaling information decoder 430.

When the HD video data, residual data used to restore the UHD video data along with the HD video data and signaling information are multiplexed and transmitted, the demultiplexer 420 may demultiplex an HD video stream, a residual data stream and the signaling information.

The signaling information decoder 440 may decode the demultiplexed signaling information.

Then, the decoder 440 can decode the HD video data demultiplexed by the demultiplexer 420 according to the decoded signaling information or restore the UHD video data using the demultiplexed HD video stream and residual data stream.

MODE FOR INVENTION

The best mode for the invention has been described.

INDUSTRIAL APPLICABILITY

The present invention can be used in broadcast and video signal processing fields, has reproducibility and is industrially applicable.

The invention claimed is:
1. A method for transmitting a broadcast signal, the method comprising:
generating high definition (HD) video data from ultra high definition (UHD) video data;
wherein the UHD video data is converted to the HD video data by:
filtering the UHD video data through a low pass filter,
down-sampling the filtered UHD video data using a sub-video sampling factor which is a combination of even or odd pixels in a sampling unit, and
generating, based on the down-sampled UHD video data, the HD video data in an interlaced way in which the generated HD video data includes interlaced HD video frames by scanning top or bottom fields;
acquiring residual data from the UHD video data; and
transmitting the broadcast signal,
wherein the broadcast signal includes the generated HD video data as a base layer stream and the residual data of the UHD video data as an enhancement layer stream,
wherein the broadcast signal further includes signaling information,
wherein the signaling information includes a service type of a service provided by the broadcast signal and a video format of the service, and wherein the video format indicates information representing whether the video type is 4K or 8K.

2. The method according to claim 1, wherein the down-sampled UHD video data of a first frame rate is converted into progressive HD video data of the first frame rate, and
wherein the progressive HD video data of the first frame rate is converted into interlaced HD video data of the first frame rate.

3. The method according to claim 1, further comprising:
generating the signaling information for signaling the base layer stream and the enhancement layer stream; and
multiplexing the base layer stream, the enhancement layer stream and the signaling information.

4. An apparatus for transmitting a broadcast signal, the apparatus comprising:
a first encoder configured to generate high definition (HD) video data from ultra high definition (UHD) video data by converting the UHD video data to the HD video data, the first encoder including:
a low pass filter configured to filter the UHD video data,
a down-sampler configured to down-sample the filtered UHD video data using a sub-video sampling factor which is a combination of even or odd pixels in a sampling unit, and
a mode converter configured to generate, based on the down-sampled UHD video data, the HD video data in an interlaced way in which the generated HD video data includes interlaced HD video frames by scanning top or bottom fields;
a second encoder configured to acquire residual data from the UHD video data; and
a transmitter configured to transmit the broadcast signal,
wherein the broadcast signal includes the generated HD video data as a base layer stream and the residual data of the UHD video data as an enhancement layer stream,
wherein the broadcast signal further includes signaling information,
wherein the signaling information includes a service type of a service provided by the broadcast signal and a video format of the service, and
wherein the video format indicates information representing whether the video type is 4K or 8K.

5. The apparatus according to claim 4, wherein the mode converter is further configured to:
convert the down-sampled UHD video data of a first frame rate into progressive HD video data of the first frame rate; and
convert the progressive HD video data of the first frame rate into interlaced HD video data of the first frame rate.

6. The apparatus according to claim 4, further comprising:
a signaling unit configured to generate the signaling information for signaling the base layer stream and the enhancement layer stream; and
a multiplexer configured to multiplex the base layer stream, the enhancement layer stream and the signaling information.

* * * * *